(12) United States Patent
Parsche

(10) Patent No.: US 9,375,700 B2
(45) Date of Patent: Jun. 28, 2016

(54) HYDROCARBON CRACKING ANTENNA

(71) Applicant: HARRIS CORPORATION, Melbourne, FL (US)

(72) Inventor: Francis Eugene Parsche, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/469,345

(22) Filed: Aug. 26, 2014

(65) Prior Publication Data
US 2014/0363349 A1 Dec. 11, 2014

Related U.S. Application Data

(62) Division of application No. 13/079,279, filed on Apr. 4, 2011, now Pat. No. 8,877,041.

(51) Int. Cl.
*B01J 19/12* (2006.01)
*C10G 1/00* (2006.01)
(Continued)

(52) U.S. Cl.
CPC .................. *B01J 19/129* (2013.01); *C10G 1/00* (2013.01); *C10G 9/00* (2013.01); *E21B 43/16* (2013.01); *B01J 2219/1203* (2013.01); *C10G 2300/1025* (2013.01); *C10G 2300/1096* (2013.01)

(58) Field of Classification Search
CPC . B01J 19/129; B01J 2219/1203; E21B 43/16; C10G 9/00; C10G 1/00; C10G 2300/1096; C10G 2300/1025
See application file for complete search history.

(56) References Cited

U.S. PATENT DOCUMENTS

| 2,371,459 | A | | 3/1945 | Mittelmann |
| 2,685,930 | A | | 8/1954 | Albaugh |
| 3,131,142 | A | * | 4/1964 | Mills, Jr. ................. B01J 31/04 208/108 |

(Continued)

FOREIGN PATENT DOCUMENTS

| CA | 1199573 | 1/1986 |
| CA | 2678473 | 8/2009 |

(Continued)

OTHER PUBLICATIONS

Chute, F.S., Vermeulen, F.E., Cervenan, M.R. and McVea, F.J., "Electrical Properties of Athabasca Oil Sands", Canadian Journal of Earth Science, 16, 1979, pp. 2009-2021.

(Continued)

*Primary Examiner* — Randy Boyer
*Assistant Examiner* — Juan Valencia
(74) *Attorney, Agent, or Firm* — Allen, Dyer, Doppelt, Milbrath & Gilchrist, P.A.

(57) ABSTRACT

An aspect of at least one embodiment of the present invention is a device for cracking heavy hydrocarbons. A linear applicator is positioned within heavy oil containing aromatic molecules. A radio frequency electrical current source is electrically connected to the applicator at a first connection point and a second connection point to create a closed electrical loop. The radio frequency source is configured to apply a signal to the applicator that is sufficient to create a magnetic field and an electric field relative to the axis of the linear applicator. The device also includes a chamber positioned around the applicator generally between the first connection point and the second connection point to concentrate the magnetic field within a region surrounding the applicator and containing the heavy hydrocarbons.

28 Claims, 8 Drawing Sheets

(51) Int. Cl.
  *C10G 9/00* (2006.01)
  *E21B 43/16* (2006.01)

(56) References Cited

U.S. PATENT DOCUMENTS

| | | | |
|---|---|---|---|
| 3,449,213 A | 6/1969 | Knapp et al. | |
| 3,497,005 A | 2/1970 | Pelopsky | |
| 3,848,671 A | 11/1974 | Kern | |
| 3,954,140 A | 5/1976 | Hendrick | |
| 3,988,036 A | 10/1976 | Fisher | |
| 3,991,091 A | 11/1976 | Driscoll | |
| 4,035,282 A | 7/1977 | Stuchberry et al. | |
| 4,042,487 A | 8/1977 | Seguchi | |
| 4,087,781 A | 5/1978 | Grossi et al. | |
| 4,136,014 A * | 1/1979 | Vermeulen | C10G 1/04 204/514 |
| 4,140,179 A | 2/1979 | Kasevich et al. | |
| 4,140,180 A | 2/1979 | Bridges et al. | |
| 4,144,935 A | 3/1979 | Bridges | |
| 4,146,125 A | 3/1979 | Sanford et al. | |
| 4,196,329 A | 4/1980 | Rowland et al. | |
| 4,295,880 A | 10/1981 | Horner | |
| 4,300,219 A | 11/1981 | Joyal | |
| 4,301,865 A * | 11/1981 | Kasevich | E21B 36/04 166/248 |
| 4,328,324 A | 5/1982 | Kock | |
| 4,373,581 A | 2/1983 | Toellner | |
| 4,396,062 A | 8/1983 | Iskander | |
| 4,404,123 A | 9/1983 | Chu | |
| 4,410,216 A | 10/1983 | Allen | |
| 4,425,227 A | 1/1984 | Smith | |
| 4,449,585 A | 5/1984 | Bridges et al. | |
| 4,456,065 A | 6/1984 | Heim | |
| 4,457,365 A | 7/1984 | Kasevich et al. | |
| 4,470,459 A | 9/1984 | Copland | |
| 4,485,869 A | 12/1984 | Sresty | |
| 4,487,257 A | 12/1984 | Dauphine | |
| 4,508,168 A | 4/1985 | Heeren | |
| 4,514,305 A | 4/1985 | Filby | |
| 4,524,827 A | 6/1985 | Bridges | |
| 4,531,468 A | 7/1985 | Simon | |
| 4,583,586 A | 4/1986 | Fujimoto et al. | |
| 4,620,593 A | 11/1986 | Haagensen | |
| 4,622,496 A | 11/1986 | Dattilo | |
| 4,645,585 A | 2/1987 | White | |
| 4,678,034 A | 7/1987 | Eastlund | |
| 4,703,433 A | 10/1987 | Sharrit | |
| 4,790,375 A | 12/1988 | Bridges | |
| 4,817,711 A | 4/1989 | Jeambey | |
| 4,882,984 A | 11/1989 | Eves, II | |
| 4,892,782 A | 1/1990 | Fisher et al. | |
| 5,046,559 A | 9/1991 | Glandt | |
| 5,055,180 A | 10/1991 | Klaila | |
| 5,065,819 A | 11/1991 | Kasevich | |
| 5,082,054 A | 1/1992 | Kiamanesh | |
| 5,114,684 A | 5/1992 | Walker | |
| 5,136,249 A | 8/1992 | White | |
| 5,199,488 A | 4/1993 | Kasevich | |
| 5,233,306 A | 8/1993 | Misra | |
| 5,236,039 A | 8/1993 | Edelstein | |
| 5,251,700 A | 10/1993 | Nelson | |
| 5,293,936 A | 3/1994 | Bridges | |
| 5,304,767 A | 4/1994 | McGaffigan | |
| 5,315,561 A | 5/1994 | Grossi | |
| 5,370,477 A | 12/1994 | Bunin | |
| 5,378,879 A | 1/1995 | Monovoukas | |
| 5,506,592 A | 4/1996 | MacDonald | |
| 5,582,854 A | 12/1996 | Nosaka | |
| 5,621,844 A | 4/1997 | Bridges | |
| 5,631,562 A | 5/1997 | Cram | |
| 5,746,909 A | 5/1998 | Calta | |
| 5,910,287 A | 6/1999 | Cassin | |
| 5,923,299 A | 7/1999 | Brown et al. | |
| 6,045,648 A | 4/2000 | Palmgren et al. | |
| 6,046,464 A | 4/2000 | Schetzina | |
| 6,055,213 A | 4/2000 | Rubbo | |
| 6,063,338 A | 5/2000 | Pham | |
| 6,097,262 A | 8/2000 | Combellack | |
| 6,106,895 A | 8/2000 | Usuki | |
| 6,112,273 A | 8/2000 | Kau | |
| 6,184,427 B1 | 2/2001 | Klepfer | |
| 6,229,603 B1 | 5/2001 | Coassin | |
| 6,232,114 B1 | 5/2001 | Coassin | |
| 6,301,088 B1 | 10/2001 | Nakada | |
| 6,303,021 B2 | 10/2001 | Winter | |
| 6,348,679 B1 | 2/2002 | Ryan et al. | |
| 6,360,819 B1 | 3/2002 | Vinegar | |
| 6,432,365 B1 | 8/2002 | Levin | |
| 6,603,309 B2 | 8/2003 | Forgang | |
| 6,613,678 B1 | 9/2003 | Sakaguchi | |
| 6,614,059 B1 | 9/2003 | Tsujimura | |
| 6,649,888 B2 | 11/2003 | Ryan et al. | |
| 6,712,136 B2 | 3/2004 | De Rouffignac | |
| 6,808,935 B2 | 10/2004 | Levin | |
| 6,923,273 B2 | 8/2005 | Terry | |
| 6,932,155 B2 | 8/2005 | Vinegar | |
| 6,967,589 B1 | 11/2005 | Peters | |
| 6,992,630 B2 | 1/2006 | Parsche | |
| 7,046,584 B2 | 5/2006 | Sorrells | |
| 7,079,081 B2 | 7/2006 | Parsche et al. | |
| 7,091,460 B2 | 8/2006 | Kinzer | |
| 7,109,457 B2 | 9/2006 | Kinzer | |
| 7,115,847 B2 | 10/2006 | Kinzer | |
| 7,147,057 B2 | 12/2006 | Steele | |
| 7,172,038 B2 | 2/2007 | Terry | |
| 7,205,947 B2 | 4/2007 | Parsche | |
| 7,208,710 B2 | 4/2007 | Gregoire et al. | |
| 7,312,428 B2 | 12/2007 | Kinzer | |
| 7,322,416 B2 | 1/2008 | Burris, II | |
| 7,337,980 B2 | 3/2008 | Schaedel | |
| 7,438,807 B2 | 10/2008 | Garner et al. | |
| 7,441,597 B2 | 10/2008 | Kasevich | |
| 7,461,693 B2 | 12/2008 | Considine et al. | |
| 7,484,561 B2 | 2/2009 | Bridges | |
| 7,562,708 B2 | 7/2009 | Cogliandro | |
| 7,623,804 B2 | 11/2009 | Sone | |
| 8,128,788 B2 | 3/2012 | Proudkii et al. | |
| 2002/0032534 A1 | 3/2002 | Regier | |
| 2003/0062270 A1 * | 4/2003 | McAlister | B01D 53/32 205/697 |
| 2004/0031731 A1 | 2/2004 | Honeycutt | |
| 2005/0199386 A1 | 9/2005 | Kinzer | |
| 2005/0274513 A1 | 12/2005 | Schultz | |
| 2006/0038083 A1 | 2/2006 | Criswell | |
| 2007/0108202 A1 | 5/2007 | Kinzer | |
| 2007/0131591 A1 | 6/2007 | Pringle | |
| 2007/0137852 A1 | 6/2007 | Considine et al. | |
| 2007/0137858 A1 | 6/2007 | Considine et al. | |
| 2007/0187089 A1 | 8/2007 | Bridges | |
| 2007/0261844 A1 | 11/2007 | Cogliandro et al. | |
| 2008/0073079 A1 | 3/2008 | Tranquilla | |
| 2008/0083653 A1 | 4/2008 | Bruha | |
| 2008/0143330 A1 | 6/2008 | Madio | |
| 2009/0009410 A1 | 1/2009 | Dolgin et al. | |
| 2009/0242196 A1 | 10/2009 | Pao | |
| 2010/0122933 A1 | 5/2010 | Khan | |
| 2012/0067580 A1 | 3/2012 | Parsche | |
| 2012/0091033 A1 * | 4/2012 | Proudkii | B01J 19/126 208/49 |

FOREIGN PATENT DOCUMENTS

| | | |
|---|---|---|
| DE | 102008022176 | 11/2009 |
| EP | 0135966 | 4/1985 |
| EP | 0418117 | 3/1991 |
| EP | 0563999 | 10/1993 |
| EP | 1106672 | 6/2001 |
| FR | 1586066 | 2/1970 |
| FR | 2925519 | 6/2009 |
| JP | 56050119 | 5/1981 |
| JP | 2246502 | 10/1990 |
| WO | 2007133461 | 11/2007 |
| WO | 2008011412 | 1/2008 |
| WO | 2008030337 | 3/2008 |

(56) References Cited

FOREIGN PATENT DOCUMENTS

| WO | 2008098850 | 8/2008 |
| WO | 2009027262 | 8/2008 |
| WO | 2009114934 | 9/2009 |
| WO | WO 2010120810 | * 10/2010 |

OTHER PUBLICATIONS

Davidson, R.J., "Electromagnetic Stimulation of Lloydminster Heavy Oil Reservoirs", Journal of Canadian Petroleum Technology, 34(4), 1995, pp. 15-24.

Hu, Y., Jha, K.N. and Chakma, A., "Heavy-Oil Recovery from Thin Pay Zones by Electromagnetic Heating", Energy Sources, 21(1-2), 1999, pp. 63-73.

Kasevich, R.S., Price, S.L., Faust, D.L. and Fontaine, M.F., "Pilot Testing of a Radio Frequency Heating System for Enhanced Oil Recovery from Diatomaceous Earth", SPE28619, presented at the SPE 69th Annual Technical Conference and Exhibition held in New Orleans LA, USA, Sep. 25-28, 1994, pp. 1-15.

Koolman, M., Huber, N., Diehl, D. and Wacker, B., "Electromagnetic Heating Method to Improve Steam Assisted /N.B./ 23 Gravity Drainage", SPE117481, presented at the 2008 SPE International Thermal Operations and Heavy Oil Symposium held in Calgary, Alberta, Canada, Oct. 20-23, 2008, pp. 1-13.

Kovaleva, L.A., Nasyrov, N.M. and Khaidar, A.M., Mathematical Modelling of High-Frequency Electromagnetic Heating of the Bottom-Hole Area of Horizontal Oil Wells, Journal of Engineering Physics and Thermo Physics, 77(6), 2004, pp. 1184-1191.

McGee, B.C.W. and Donaldson, RD., "Heat Transfer Fundamentals for Electro-thermal Heating of Oil Reservoirs", CIPC 2009-024, presented at the Canadian International Petroleum Conference, held in Calgary, Alberta, Canada, Jun. 16-18, 2009, pp. 1-16.

Ovalles, C., Fonseca, A., Lara, A., Alvarado, V., Urrecheaga, K., Ranson, A. and Mendoza, H., "Opportunities of Downhole Dielectric Heating in Venezuela: Three Case Studies Involving Medium, Heavy and Extra-Heavy Crude Oil D Reservoirs" SPE78980, presented at the 2002 SPE International Thermal Operations and Heavy Oil Symposium and International Horizontal Well Technology Conference held in Calgary, Alberta, Canada, Nov. 4-7, 2002, pp. 1-10.

Rice, S.A., Kok, A.L. and Neate, C.J., "A Test of the Electric Heating Process as a Means of Stimulating the 27 Productivity of an Oil Well in the Schoonebeek Field", CIM 92-04 presented at the CIM 1992 Annual Technical Conference in Calgary, Jun. 7-10, 1992, pp. 1-16.

Sahni, A. and Kumar, M. "Electromagnetic Heating Methods for Heavy Oil Reservoirs", SPE62550, presented at the 2000 SPE/AAPG Western Regional Meeting held in Long Beach, California, Jun. 19-23, 2000, pp. 1-10.

Sayakhov, F.L., Kovaleva, L.A. and Nasyrov, N.M., "Special Features of Heat and Mass Exchange in the Face Zone of /N.B./ 29 Boreholes upon Injection of a Solvent with a Simultaneous Electromagnetic Effect", Journal of Engineering Physics and Thermophysics, 71(1), 1998, pp. 161-165.

Spencer, H.L., Bennett, K.A. and Bridges, J.E. "Application of the IITRI/Uentech Electromagnetic Stimulation Process iN.B.i 30 to Canadian Heavy Oil Reservoirs" Paper 42, Fourth International Conference on Heavy Oil Crude and Tar Sands, UNITARIUNDP, Edmonton, Alberta, Canada, Aug. 7-12, 1988, pp. 1-8.

Sresty, G.C., Dev, H., Snow, R.H. and Bridges, J.E., "Recovery of Bitumen from Tar Sand Deposits with the Radio Frequency Process", SPE Reservoir Engineering, Jan. 1986, pp. 85-94.

Vermulen, F. and McGee, B.C.W., "In Situ Electromagnetic Heating for Hydrocarbon Recovery and Environmental Remediation", Journal of Canadian Petroleum Technology, Distinguished Author Series, 39(8), 2000, pp. 25-29.

Schelkunoff, S.K. and Friis, H.T., "Antennas: Theory and Practice", John Wiley & Sons, Inc., London, Chapman Hall, Limited, 1952, pp. 229-244, 351-353.

Gupta, S.C., Gittins, S.D., "Effect of Solvent Sequencing and Other Enhancement on Solvent Aided Process", Journal of Canadian Petroleum Technology, vol. 46, No. 9, Sep. 2007, pp. 57-61.

Kovalyova et al., "Physical and Rheological Properties of Petroleum Fluids Under the Radio-Frequency Electromagnetic Field Effect and Perspectives of Technological Solutions", Applied Surface Science, vol. 238, Sep. 17, 2004, pp. 475-479.

Shin et al., "Decomposition of Benzene in the RF Plasma Environment. Part 1. Formation of Gaseous Products and Carbon Depositions", Journal of Hazardous Materials, vol. B116, Dec. 31, 2006, pp. 239-248.

Shin et al., "Decomposition of Benzene in the RF Plasma Envifonment. Part II. Formation of Polycyclic Aromatic Compounds", Journal of Hazardous Materials, vol. B117, Dec. 8, 2004, pp. 149-159.

PCT Notification of Transmittal of the International Search Report and the Written Opinion of the International Searching Authority, or the Declaration, in PCT/US2010/025761, dated Feb. 9, 2011, pp. 1-13.

PCT Notification of Transmittal of the International Search Report and the Written Opinion of the International Searching Authority, or the Declaration, in PCT/US2010/057090, dated Mar. 3, 2011, pp. 1-10.

"Control of Hazardous Air Pollutants From Mobile Sources", U.S. Environmental Protection Agency, Mar. 29, 2006. p. 15853 (http://www.epa.gov/EPA-Air/2006/March/Day-29/a2315b.htm), pp. 1-13.

Von Hippel, Arthur R., Dielectrics and Waves, Copyright 1954, Library of Congress Catalog Card No. 54-11020, Contents, pp. xi-xii; Chapter II, Section 17, "Polyatomic Molecules", Appendix C-E, New York, John Wiley and Sons, pp. 150-155, pp. 273-277.

United States Patent and Trademark Office, Non-final Office action issued in U.S. Appl. No. 12/396,247, dated Mar. 28, 2011, pp. 1-10.

United States Patent and Trademark Office, Non-final Office action issued in U.S. Appl. No. 12/396,284, dated Apr. 26, 2011, pp. 1-62.

Patent Cooperation Treaty, Notification of Transmittal of the International Search Report and the Written Opinion of the International Searching Authority, or the Declaration, in PCT/US201 0/025808, dated Apr. 5, 2011, pp. 1-12.

Deutsch, C.V., McLennan, J.A., "The Steam Assisted Gravity Drainage (SAGD) Process," Guide to SAGD (Steam Assisted Gravity Drainage) Reservoir Characterization Using Geostatistics, Centre for Computational Statistics (CCG), Guidebook Series, 2005, vol. 3; p. 2, section 1.2, published by Centre for Computational Statistics, Edmonton, AB, Canada, pp. 1-14.

Marcuvitz, Nathan, Waveguide Handbook; 1986; Institution of Engineering and Technology, Volume 21 of IEE Electromagnetic Wave series, ISBN 0863410588, Chapter 1, pp. 1-54, published by Peter Peregrinus Ltd. on behalf of The Institution of Electrical Engineers,© 1986, pp. 1-57.

Marcuvitz, Nathan, Waveguide Handbook; 1986; Institution of Engineering and Technology, Volume 21 of IEE Electromagnetic Wave series, ISBN 0863410588, Chapter 2.3, pp. 66-72, published by Peter Peregrinus Ltd. on behalf of The Institution of Electrical Engineers,© 1986. pp. 1-10.

"Oil sands." Wikipedia, the free encyclopedia. Retrieved from the Internet from: http://en.wikipedia.org/w/index.php?title=Oil_sands&printable=yes, Feb. 16, 2009, pp. 1-14.

Sahni et al., "Electromagnetic Heating Methods for Heavy Oil Reservoirs." 2000 Society of Petroleum Engineers SPE/AAPG Western Regional Meeting, Jun. 19-23, 2000, pp. 1-12.

Power et al., "Froth Treatment: Past, Present & Future." Oil Sands Symposium, University of Alberta, May 3-5, 2004, pp. 1-29.

Flint, "Bitumen Recovery Technology A Review of Long Term R&D Opportunities." Jan. 31, 2005. Consulting (1994) Limited, Part 1, 100 pgs; Part 2, 110 pgs.

"Froth Flotation." Wikipedia, the free encyclopedia. Retrieved from the internet from: http://en.wikipedia.org/wiki/Froth_flotation, Apr. 7, 2009, pp. 1-6.

"Relative static permittivity." Wikipedia, the free encyclopedia. Retrieved from the Internet from http://en.wikipedia.org/w/index/php?title=Relative_static_permittivity&printable=yes, Feb. 12, 2009, pp. 1-3.

"Tailings." Wikipedia, the free encyclopedia. Retrieved from the Internet from http://en.wikipedia.orglw/index.php?title=Tailings&printable=yes, Feb. 12, 2009, pp. 1-6.

(56) References Cited

OTHER PUBLICATIONS

"Technologies for Enhanced Energy Recovery" Executive Summary, Radio Frequency Dielectric Heating Technologies for Conventional and Non-Conventional Hydrocarbon-Bearing Formulations, Quasar Energy, LLC, Sep. 3, 2009, pp. 1-6.

Burnhan, "Slow Radio-Frequency Processing of Large Oil Shale Volumes to Produce Petroleum-like Shale Oil," U.S. Department of Energy, Lawrence Livermore National Laboratory, Aug. 20, 2003, UCRL-ID-155045, pp. 1-17.

Sahni et al., "Electromagnetic Heating Methods for Heavy Oil Reservoirs," U.S. Department of Energy, Lawrence Livermore National Laboratory, May 1, 2000, UCL-JC-138802, pp. 1-10.

Abernethy, "Production Increase of Heavy Oils by Electromagnetic Heating," The Journal of Canadian Petroleum Technology, Jul.-Sep. 1976, pp. 91-97.

Sweeney, et al., "Study of Dielectric Properties of Dry and Saturated Green River Oil Shale," Lawrence Livermore National Laboratory, Mar. 26, 2007, revised manuscript Jun. 29, 2007, published on Web Aug. 25, 2007, pp. 1-9.

Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-18.

Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-33.

Kinzer, A Review of Notable Intellectual Property for in Situ Electromagnetic Heating of Oil Shale, Quasar Energy LLC, p. 1. 2009.

A. Godio: "Open ended-coaxial Cable Measurements of Saturated Sandy Soils", American Journal of Environmental • Sciences, vol. 3, No. 3, 2007, XP002583544, pp. 175-182.

Carlson et al., "Development of the IIT Research Institute RF Heating Process for in Situ Oil Shale/Tar Sand Fuel Extraction—An Overview", Apr. 1981, pp. 1-9.

PCT International Search Report and Written Opinion in PCT/US2010/025763, Jun. 4, 2010, pp. 1-15.

PCT International Search Report and Written Opinion in PCT/US2010/025807, Jun. 17, 2010, pp. 1-15.

PCT International Search Report and Written Opinion in PCT/US2010/025804, Jun. 30, 2010, pp. 1-15.

PCT International Search Report and Written Opinion in PCT/US2010/025769, Jun. 10, 2010, pp. 1-15.

PCT International Search Report and Written Opinion in PCT/US2010/025765, Jun. 30, 2010, pp. 1-11.

PCT International Search Report and Written Opinion in PCT/US2010/025772, Aug. 9, 2010, pp. 1-16.

Butler, R.M. "Theoretical Studies on the Gravity Drainage of Heavy Oil During In-Situ Steam Heating", Can J. Chem Eng, vol. 59,1981, pp. 1-6.

Butler, R. and Mokrys, I., "A New Process (VAPEX) for Recovering Heavy Oils Using Hot Water and Hydrocarbon Vapour", Journal of Canadian Petroleum Technology, 30(1 ), 1991, pp. 97-106.

Butler, R. and Mokrys, I., "Recovery of Heavy Oils Using Vapourized Hydrocarbon Solvents: Further Development of the VAPEX Process", Journal of Canadian Petroleum Technology, 32(6), 1993, pp. 56-62.

Butler, R. and Mokrys, I., "Closed Loop Extraction Method for the Recovery of Heavy Oils and Bitumens Underlain by Aquifers: the VAPEX Process", Journal of Canadian Petroleum Technology, 37(4), 1998, pp. 41-50.

Das, S.K. and Butler, R.M., "Extraction of Heavy Oil and Bitumen Using Solvents at Reservoir Pressure" CIM 95-118, presented at the CIM 1995 Annual Technical Conference in Calgary, Jun. 1995, pp. 1-16.

Das, S.K. and Butler, R.M., "Diffusion Coefficients of Propane and Butane in Peace River Bitumen" Canadian Journal of Chemical Engineering, 74,988-989, Dec. 1996 pp. 1-8.

Das, S.K. and Butler, R.M., "Mechanism of the Vapour Extraction Process for Heavy Oil and Bitumen", Journal of Petroleum Science and Engineering, 21, 1998, pp. 43-59.

Dunn, S.G., Nenniger, E. and Rajan, R., "A Study of Bitumen Recovery by Gravity Drainage Using Low Temperature Soluble Gas Injection", Canadian Journal of Chemical Engineering, 67, Dec. 1989, pp. 978-991.

Frauenfeld, T., Lillico, D., Jossy, C., Vilcsak, G., Rabeeh, S. and Singh, S., "Evaluation of Partially Miscible Processes for Alberta Heavy Oil Reservoirs", Journal of Canadian Petroleum Technology, 37(4), 1998, pp. 17-24.

Mokrys, I., and Butler, R., "In Situ Upgrading of Heavy Oils and Bitumen by Propane Deasphalting: The VAPEX 11 Process", SPE 25452, presented at the SPE Production Operations Symposium held in Oklahoma City OK USA, D Mar. 21-23, 1993, pp. 1-16.

Nenniger, J.E. and Dunn, S.G., "How Fast is Solvent Based Gravity Drainage?", CIPC 2008-139, presented at the Canadian International Petroleum Conference, held in Calgary, Alberta Canada, 17-19 Jun. 17-19, 2008, pp. 1-14.

Nenniger, J.E. and Gunnewick, L., "Dew Point vs. Bubble Point: A Misunderstood Constraint on Gravity Drainage Processes", CIPC 2009-065, presented at the Canadian International Petroleum Conference, held in Calgary, Alberta D Canada, Jun. 16-18, 2009, pp. 1-16.

Bridges, J.E., Sresty, G.C., Spencer, H.L. and Wattenbarger, R.A., "Electromagnetic Stimulation of Heavy Oil Wells", 14, Third International Conference on Heavy Oil Crude and Tar Sands, UNITAR/UNDP, Long Beach D California, USA Jul. 22-31, 1985, pp. 1221-1232.

Carrizales, M.A., Lake, L.W. and Johns, R.T., "Production Improvement of Heavy Oil Recovery by Using Electromagnetic Heating", SPE115723, presented at the 2008 SPE Annual Technical Conference and Exhibition held in Denver, Colorado, USA, Sep. 21-24, 2008, p. 1.

Carrizales, M. and Lake, L.W., "Two-Dimensional Comsol Simulation of Heavy-Oil Recovery by Electromagnetic Heating", Proceedings of the Comsol Conference Boston, 2009, pp. 1-7.

Chakma, A. and Jha, K.N., "Heavy-Oil Recovery from Thin Pay Zones by Electromagnetic Heating", SPE24817, presented at the 67th Annual Technical Conference and Exhibition of the Society of Petroleum Engineers held in Washington, DC, Oct. 4-7, 1992, pp. 1-10.

Chhetri, A.B. and Islam, M.R., "A Critical Review of Electromagnetic Heating for Enhanced Oil Recovery", Petroleum Science and Technology, 26(14), 2008, pp. 1619-1631.

\* cited by examiner

HYDROCARBON CRACKING ANTENNA

BACKGROUND OF THE INVENTION

The present invention relates to using electromagnetic fields and in particular radio frequency electric and magnetic fields to crack or upgrade heavy hydrocarbons. Upgrading heavy hydrocarbons aids in the extraction and processing of hydrocarbons into valuable fuels. In particular, the present invention relates to an advantageous radio frequency (RF) applicator and method that can be used to crack heavy hydrocarbons. The invention breaks the usually unreactive carbon-carbon (C—C) bonds of aromatic molecules, which can be used to upgrade bitumen, reduce the aromatic content of gasoline, or assist in petrochemical synthesis.

As the world's standard crude oil reserves are depleted, and the continued demand for oil causes oil prices to rise, oil producers are attempting to process hydrocarbons from bituminous ore, oil sands, tar sands, oil shale, and heavy oil deposits. These materials are often found in naturally occurring mixtures of sand or clay. Because of the extremely high viscosity of bituminous ore, oil sands, oil shale, tar sands, and heavy oil (heavy hydrocarbons for short), the drilling and refinement methods used in extracting standard crude oil are typically not available. Enhanced oil recovery (EOR) processes are required.

Current EOR technology heats the hydrocarbon formations through the use of steam and sometimes through the use of RF energy to heat or preheat the formation. Steam has been used to provide heat in-situ, such as through a steam assisted gravity drainage (SAGD) system. Steam enhanced oil recovery may not be suitable for permafrost regions due to surface melting, in stratified and thin pay reservoirs with rock layers, and where there is insufficient caprock. At well start up, for example, the initiation of the steam convection may be slow and unreliable as conducted heating in hydrocarbon ores is slow. Water resources may be insufficient to make steam.

RF heating methods use connate in situ water, such as pore water, which is generally present in a hydrocarbon formation. Water is easily heated by electromagnetic fields, so an underground antenna can heat hydrocarbon formations. The electromagnetically heated pore water conductively heats the hydrocarbons. Because electric and magnetic fields travel near the speed of light, RF heating provides greatly increased speed and penetration through conduction and convection. RF energy can also penetrate impermeable rocks to heat beyond. A radio frequency electromagnetic means to crack and upgrade oil in situ is valuable, especially if accompanied by well stimulation.

Heavy hydrocarbons, such as crude oil and bitumen, often contain aromatic molecules, which make the oil thick and heavy, and thus difficult to extract. Aromatic molecules are molecules, such as benzene, where the atoms are joined together in a ring shape. Breaking the aromatic rings, which is also known as cracking, creates lighter and thus easier to extract polar hydrocarbon molecules. This process is known as "upgrading" the oil. Aromatic molecules are exceptionally stable molecules and are therefore very difficult to crack. Thus, using radio frequency magnetic fields to crack aromatic molecules can be advantageous.

RF electromagnetic (EM) fields can interact strongly with some molecules and weakly with others. In a mixture of molecules, RF EM heating can increase the kinetic energy of one type of molecule without increasing the kinetic energy of other molecule types, which results in selective heating. Thus, high localized temperatures can be achieved without excessively heating a material in bulk. Temperature plays an important role in determining the rate and extent to which chemical reactions occur. Thus, RF EM fields can be effective to cause reactions involving hydrocarbon molecules.

Gasoline is the ubiquitous fuel for automotive transportation. The United States used 140 billion gallons in 2005. In order to meet this demand, modern gasoline is a blend of hydrocarbon molecules typically ranging from 4 to 12 carbons ($C_4$ to $C_{12}$). Many types of gasoline molecules, such as aromatic molecules, are hazardous substances that are regulated in the United States and elsewhere. While aromatic molecules are beneficial for high octane (benzene has an octane value of 101), they are released in engine exhaust and evaporated when the gas is pumped. Thus, gasoline formulation includes tradeoffs in choosing the hydrocarbon molecular species, the emissions level, and the toxicity level of those emissions.

Benzene has been identified as a toxic air pollutant and a potent carcinogen in the US Clean Air Act of 1990. Measured amounts of benzene in polluted city atmospheres are known to cause leukemia, lung, and skin cancer. In view of such severe health effects, the United States Environmental Protection Agency enacted regulations that will lower the benzene content in gasoline to 0.62% in 2011 ("Control of Hazardous Air Pollutants From Mobile Sources", U.S. Environmental Protection Agency, 2006 Mar. 29. p. 15853 (http://www.epa.gov/EPA-AIR/2006/March/Day-29/a2315b.htm)). Removing aromatics from gasoline reduces toxic emissions which in turn reduces the incidence of leukemia and other cancers. Technologies to reduce benzene levels are needed.

Modern gasoline is a product of varying refinery processes. The Fluid Catalytic Cracking Unit (FCCU) is an example of a process that breaks large high boiling range hydrocarbons into gasoline range products. FCCU output may contain 30 percent aromatics. In a typical FCCU, aromatics like benzene may undergo little cracking. Catalytic Naptha Reforming Units (CNRU) convert saturated low octane hydrocarbons into higher octane products containing 60 percent or more aromatics. Therefore, in a CNRU toxic aromatics are in fact created, especially so if $C_6$ is included in the feedstock. Methods to adjust FCCU and CNRU output aromatic levels can be advantageous.

Steam cracking is a process in which heavier hydrocarbons are mixed with water and heated to high temperatures such as 900° C. to break down heavier hydrocarbons into smaller, lighter hydrocarbons. In steam cracking radical addition may occur to form new aromatic molecules, yet it may be desired to not form aromatic molecules. A steam cracking process that does not produce aromatics can be advantageous.

U.S. Pat. No. 6,303,021 to Winter et. al, and entitled "Apparatus and Process For Improved Aromatic Extraction From Gasoline" describes a glycol solvent based process for separating gasoline aromatics that includes contacting the feedstock with solvent vapors. Means to actually crack the aromatic molecules are not provided.

A list of possibly relevant patents and literature follows:

| | |
|---|---|
| 4,645,585 | White |
| 6,303,021 | Winter |
| 6,106,895 | Usuki |
| 4,404,123 | Chu |
| 3,991,091 | Driscoll et al |
| Dielectrics and Waves (John Wiley and Sons) p. 154 | Arthur H. Von Hippel |

SUMMARY OF THE INVENTION

The present invention is a device for cracking hydrocarbons including heavy hydrocarbons. A linear applicator is positioned within heavy hydrocarbons containing aromatic molecules. A radio frequency electrical current source is electrically connected to the applicator at a first connection point and a spaced second connection point to create a closed electrical loop. The radio frequency source is configured to apply a signal to the applicator sufficient to create a magnetic field and electric field relative to the axis of the linear applicator. The device can also include a chamber positioned around the applicator generally between the first connection point and the second connection point to concentrate the magnetic field within a region surrounding the applicator and to contain the heavy hydrocarbons.

Another embodiment of the present invention provides a circular applicator positioned within heavy hydrocarbons containing aromatic molecules. A radio frequency electrical current source is electrically connected to the circular applicator. The radio frequency source is configured to apply a signal to the applicator that is sufficient to create electric and magnetic fields that are generally present inside the circular applicator, and thus concentrated within a region containing the heavy hydrocarbons.

Another aspect of the present invention is a method for preheating heavy hydrocarbons. An applicator is placed into already extracted heavy hydrocarbons including aromatic molecules. A radio frequency electrical current is applied to the linear applicator sufficient to create an electric and magnetic field relative to the applicator. Aromatic molecules are cracked resulting in lighter polar molecules. The cracked hydrocarbons are then separated from water and sand and other materials. The hydrocarbons are then processed into fuels.

Another aspect of the present invention is a method for upgrading heavy hydrocarbons. The heavy hydrocarbons are separated from water, sand, and optionally other materials. An applicator is placed into the heavy hydrocarbons. The applicator is operated as the hydrocarbons are hydrogenated. A radio frequency electric current is applied to the applicator sufficient to create a magnetic and electric field relative to the applicator while hydrogen or natural gas are added to the hydrocarbons to produce synthetic crude oil. The hydrocarbons are then processed into fuels.

Another aspect of the present invention is a method for extracting heavy hydrocarbons. An applicator is installed into the ore region of a hydrocarbon formation containing aromatic molecules. A radio frequency electric current is applied to the applicator sufficient to create a magnetic and electric field relative to the applicator. The aromatic molecules are cracked into lighter polar molecules. The polar molecules are then removed from the geologic formation.

Other aspects of the invention will be apparent from this disclosure.

DETAILED DESCRIPTION OF THE PREFERRED EMBODIMENTS

The subject matter of this disclosure will now be described more fully, and one or more embodiments of the invention are shown. This invention may, however, be embodied in many different forms and should not be construed as limited to the embodiments set forth herein. Rather, these embodiments are examples of the invention, which has the full scope indicated by the language of the claims.

Figure 1:
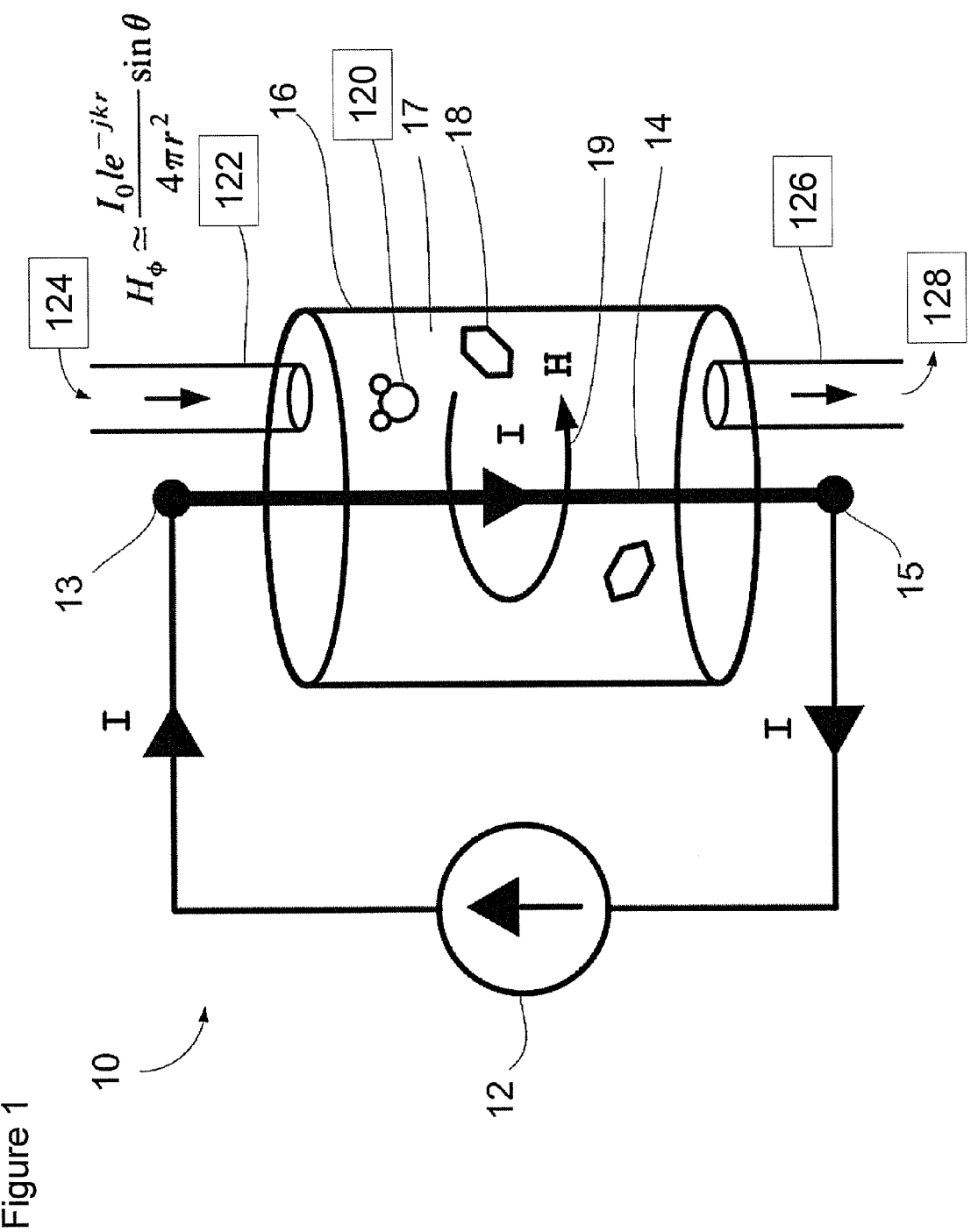
FIG. 1 is a diagrammatic perspective view of an embodiment of a linear applicator.

FIG. 1 shows a diagrammatic representation of a linear applicator (also known as a divergence antenna) that can be used to crack aromatic molecules into polar molecules. The device generally indicated at 10 can be used in situ in a hydrocarbon formation but can also be used to crack heavy oil at an upgrader refinery or other location or to reduce aromatics in gasoline. The device 10 includes a radio frequency electrical current source 12, a linear applicator 14, and a chamber 16.

The radio frequency current source 12 is electrically connected to the linear applicator 14 at a first connection point 13 and a second connection point 15, spaced from the first connection point 13, thereby creating a closed electrical loop. In practice, the catalyst effect of radio frequency electromagnetic fields is not limited to one specific frequency, so a range of frequencies can be used to crack the aromatic molecules into polar molecules. Frequencies between about 0.001 and 100 MHz can be effective to crack aromatic molecules. More particularly, frequencies between about 6.7 MHz and 40.7 MHz can be effective to crack aromatic molecules. For example, in field testing, a frequency of 6.78 MHz was applied to effectively crack aromatic molecules. The use of the water antiresonance frequency, which is about 30 MHz, can also be effective and operation near the water antiresonance is contemplated to minimize energy requirements and cost. The invention advantageously operates with electromagnetic near fields at relatively low frequencies to provide sufficient depth of penetration for large underground formations or industrial above-ground feedstock.

The length of the linear applicator 14 is preferentially short relative the radio wavelength; that is, $L \ll c/(f\sqrt{\in_r})$ where L is the length of the linear applicator 14 in the hydrocarbon mixture, c is the speed of light, f is the radio frequency in hertz, and $\in_r$ is the relative dielectric constant of the hydrocarbon mixture. For example, at 6.78 MHz the free space wavelength is about 44 meters and Athabasca oil sand can have a permittivity of about 6, so for these conditions, the linear applicator 14 can be about 4 meters in length. Multiple linear applicators 14 can be used to cover longer distances. For example, an array of linear applicators 14 may be placed end to end or otherwise. A linear applicator 14 generally functions as a transducer of electric and magnetic near fields.

The radio frequency current source 12 can include a transmitter 22 and an impedance matching coupler 24. The coupler 24 can be selected from numerous devices such as transformers, resonating capacitors, inductors, and other known components to conjugate, match, and manage the dynamic impedance changes of the ore load as it heats. The transmitter 22 can also be an electromechanical device such as a multiple pole alternator or a variable reluctance alternator with a slotted rotor that modulates coupling between two inductors. The RF source 12 may also be a vacuum tube device, such as an Eimac 8974/X-2159 power tetrode or an array of solid state devices. Thus, there are many options to realize the RF source 12.

Figure 2:
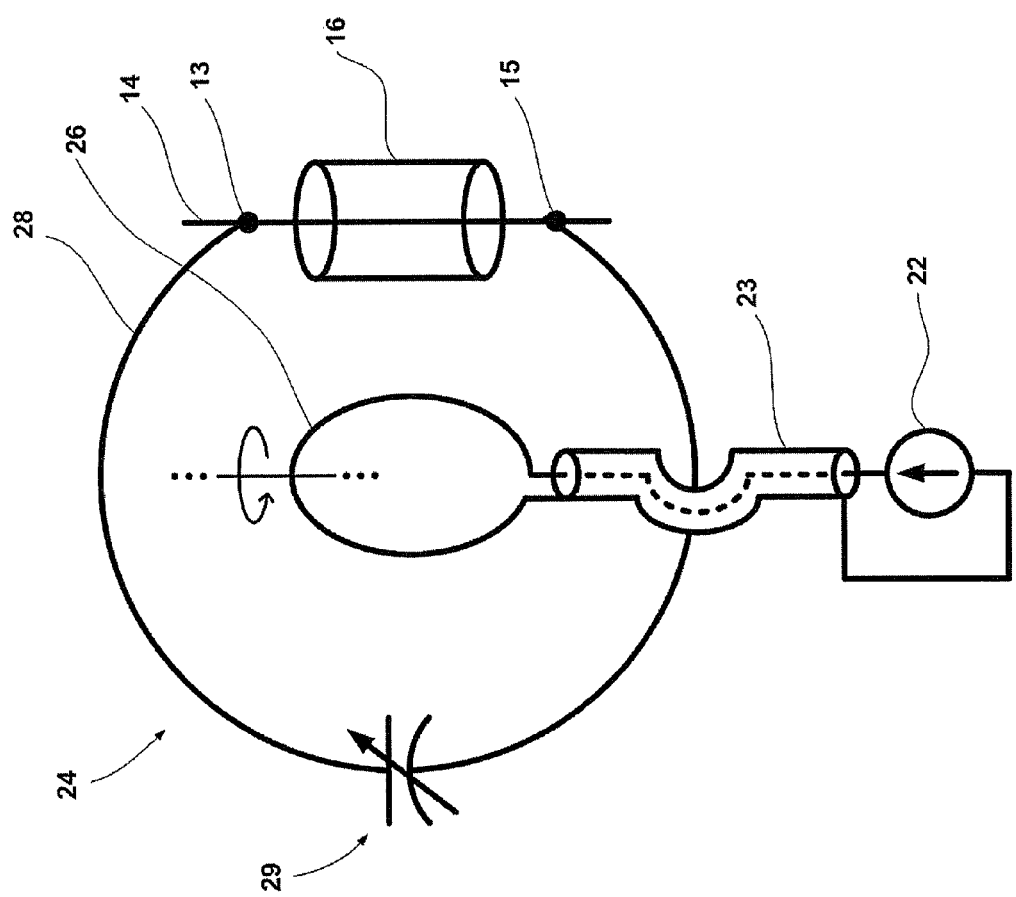
FIG. 2 is a diagrammatic perspective view of an embodiment of a linear applicator including specific parts of a radio frequency electric current source.

In a configuration shown in FIG. 2, the radio frequency current source includes a transmitter 22, a transformer indicated generally as 24 with a primary ring 26 and a secondary ring 28, and a tuning capacitor 29. The primary ring 24 and the secondary ring 26 can be, for example, copper tubing. The transmitter 22 is electrically connected to the primary ring 26 through a coaxial cable 23. The primary ring 26 can be adjusted, for example, by turning it at an angle relative to the secondary ring 28, which changes the load resistance that the transmitter 22 sees. The tuning capacitor 29 is electrically connected to the secondary ring 26, which allows precision adjustments to the transformer 24 resonance. In field testing, a 10 to 1000 picofarad variable capacitor was adjusted to about 90 picofarads to adjust the transformer resonance to 6.78 Megahertz. The secondary ring 26 is attached to the linear applicator 14 at the first connection point 13 and the second connection point 15.

The linear applicator 14 can be any linear conductor, for example, a metal rod or litz cable. Optionally, the linear applicator 14 can be electrically insulated on its surface, for example, with polyimide or Teflon. In certain embodiments, the linear applicator 14 can be a conductive well pipe positioned within the ore region of a hydrocarbon formation. The conductive well pipe can be a typical steel well pipe or can be coated with copper or another conductive metal. The linear applicator 14 is positioned within ore containing aromatic molecules. For example, the linear applicator 14 can be positioned in situ within an ore region of a hydrocarbon formation. Alternatively, the linear applicator 14 can be located in a refinery or other location and used to crack heavy hydrocarbons that have already been extracted. The linear applicator 14 can also be placed at a gas tank to reduce the aromatic content of gasoline.

A chamber 16 surrounds the linear applicator 14 generally between the first connection point 13 and the second connection point 15. Chamber 16 can function as an oil sand separation cell or cyclone separator by including an inlet 122 and an outlet 126. The chamber 16 can be comprised of any electrically conductive or nonconductive material including, for example, steel, plastic, fiberglass, polyimide, or asphalt cement. When a conductive chamber 16 is used, feedthrough insulators (not pictured) are included to allow the RF electrical currents to follow the applicator into the chamber. Within the chamber 16 are hydrocarbons 17 including aromatic molecules 18. Water molecules 120 can be present or provided. A caustic alkali such as sodium hydroxide can be provided as a surfactant.

Pressurized air 124 can be supplied to the chamber 16 to pressure drive the warmed bitumen from connate sand. The cracked and upgraded hydrocarbons 128 can be drained through the outlet 126. A batch or a continuous process can be realized in the chamber 16. Additional chamber 16 ports (not shown) can supply process water, caustic alkali, salt, or other materials.

When the applicator 10 is operated, current I flows through the linear applicator 14, which creates electric and magnetic near fields in the hydrocarbon 17. The flux lines of the circular magnetic induction field H curl around the applicator 14 while expanding outward radially. The operative mechanism is Ampere's Circuital Law:

$$\int B \cdot dl$$

to form the magnetic near field. The applicator 14 also produces electric near fields which operate from Gauss' Law:

$$\nabla \cdot D$$

(in which the symbol on the left is a del operator). With further derivation, in free space the electromagnetic near fields produced the linear applicator 14 are exactly:

$$E_r = -j\eta(I_o L e^{-jkr}/2\pi kr^3)\cos\theta$$

$$E_\theta = -j\eta(I_o L e^{-jkr}/4\pi kr^3)\sin\theta$$

$$H_\phi = -j\eta(I_o L e^{-jkr}/4\pi kr^2)\sin\theta$$

$$E_\phi = H_r = H_\phi = 0$$

Where:
$E_r$=the radial electric near field
$E_\theta$=the circular electric near field
$H_\phi$=the circular magnetic near field (induction field)
$-j$=the complex operator=$\sqrt{-1}$
$I_0$=the electric current flowing in the linear applicator 14, uniform distribution assumed
L=the length of the linear applicator 14
$e^{-jkr}$=the time harmonic excitation (AC sinusoidal current is assumed)
k=the wave number=$2\pi/\lambda$
r=the radial distance measured from the center of the linear applicator 14
θ=the angle measured from the axis of the linear applicator 14 (parallel to the linear applicator 14 is 0 degrees, normal to the linear applicator 14 is 90 degrees)

Both electric and magnetic near fields are generated by the applicator 14. The fields are rotationally symmetric around the applicator 14. When moist hydrocarbons (hydrocarbons containing water) surround the applicator 14, the electric and magnetic fields are modified from the free space proportions, although the geometry of the produced electric and magnetic near fields $E_r$, $E_\theta$ and $H_\phi$ are the same.

Hand computation of the linear applicator 14 near field amplitudes in hydrocarbons may be neither practical nor desirable, so a computer method may be preferred. One such method is the method of moments software known as the Numerical Electromagnetic Code (NEC4.1) by Lawrence Livermore National Laboratories (700 East Ave., Livermore Calif. 94550). This analysis software has been used to accurately calculate the electric and magnetic near fields of the linear applicator 14 in hydrocarbons. When the using the NEC4.1 software it is important to invoke the Summerfeld-Norton routine (GN line −1) for real earth.

In the NEC4.1, code the applicator structure 14 geometry is emulated by a wire mesh and the electromagnetic properties of the hydrocarbon are input using the relative dielectric constant $\in_r$" and the electrical conductivity σ. For instance, a rich Athabasca oil sand at 6.78 MHz may be about $\in_r$"=6 and σ=0.002 mhos/meter. The linear applicator 14 transduces both electric near fields and magnetic near fields in the hydrocarbon 17, and the distribution of those fields can be mapped precisely.

The linear applicator 14 primarily operates through near fields rather than far fields. As such, the linear applicator 14 does not have to produce radio waves to be effective. An advantage is that it is not necessary to have a cavity or a standoff distance between the applicator 14 and the hydrocarbon 17, which would be costly to create. The linear applicator 14 can be immersed directly in underground formations and operated while in contact with hydrocarbons. Above ground, the applicator 14 may be directly in contact with a hydrocarbon feedstock as well, although a standoff distance between the hydrocarbon material and the linear applicator 14 can be used if desired. The applicator 14 is effective at lower rather than higher radio frequencies, which provides the operative advantage of increased power and penetration. It can be advantageous to generate alternating electrical energy at lower rather than higher frequencies for reasons of efficiency.

Operation at hydrocarbon molecule resonance frequencies is not required, although they can be used if desired. The magnetic and electric near fields about the linear applicator 14 interact with the various species of molecules in moist hydrocarbons. Electric near fields can increase the kinetic energy of water molecules, and they can excite the dielectric moments of the hydrocarbon molecules themselves, which can cause cracking and upgrading of the hydrocarbons. Magnetic near fields can induction heat the water molecules by creating eddy electric currents that heat by joule effect. The magnetic fields can create eddy electric currents in the aromatic molecule rings. Adding small amounts of water to the hydrocarbon feedstock or underground ore prior to exposing the hydrocarbons to electromagnetic fields can thus be advantageous. RF and moist hydrocarbons provide in effect a low bulk temperature steam cracking process.

Aromatic molecules are both conductive loops and planar molecules. It is contemplated that magnetic fields break the aromatic molecules because the aromatic molecules have an inductive like relationship to the linear applicator 14. In other words, the linear applicator 14 is akin to a transformer primary winding, and the aromatic molecules are akin to a transformer secondary winding. The work function of moving the electrons around the aromatic molecules can break the aromatic molecules and the aromatic ring current can be induced in the u electrons. It is further contemplated that the planar aromatic molecules can reorient their planes normal to the magnetic field flux lines, and this orientation causes the polycyclic aromatic molecules to crack as they break their attachments to other rings. Both the electric and magnetic fields may interact with small amounts of water present in the hydrocarbon stock to create radicals, especially the hydroxyl radical OH—, which can help initiate upgrading.

It is contemplated that the linear applicator 14 does not behave significantly as an electrode, even when uninsulated and in direct contact with moist hydrocarbons. In other words, the linear applicator 14 does not significantly feed electrons into the hydrocarbon stock by conductive contact. This is because the linear applicator 14 provides a highly electrically conductive path relative to the more resistive hydrocarbon material, so nearly all of the electric current follows the linear applicator 14 path. This is an advantage as it enhances process reliability. Electrode systems in hydrocarbons can be unreliable due to asphaltine deposition on the electrode (especially with live oils), water boil off at the electrodes, or coking. Thus, the advantages of the linear applicator 14 can include one or more of the following: it is reliable, not limited as to power, and it does not require water flooding or other means to maintain electrical contact with the hydrocarbons. The linear applicator 14 achieves indirect electrical contact with hydrocarbon mixtures by magnetic field induction and electric field displacement.

Figure 3:
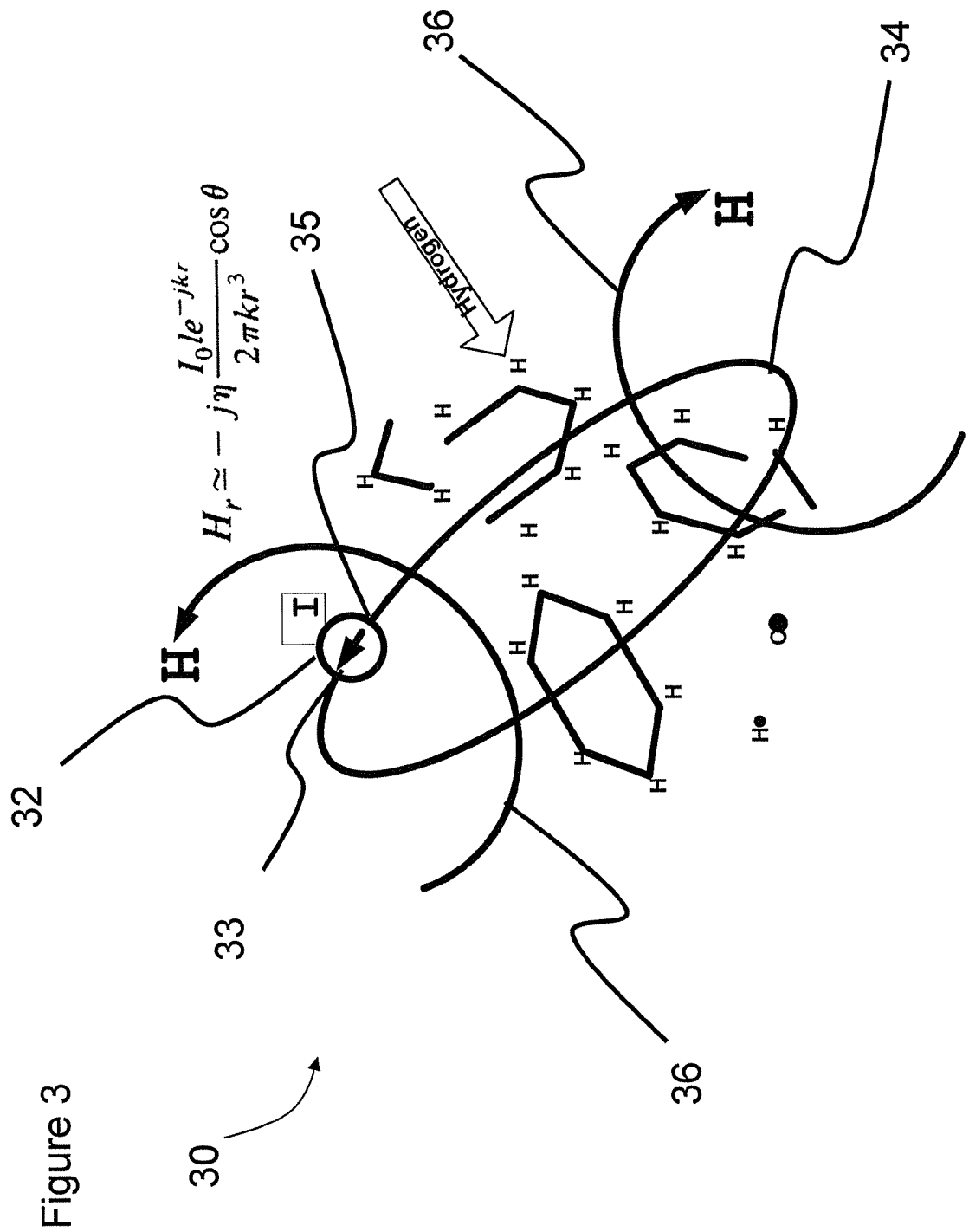
FIG. 3 is a diagrammatic perspective view of an embodiment of a circular applicator.

FIG. 3 shows a diagrammatic representation of an alternative embodiment, where a circular applicator 30 (also known as a loop or curl antenna) is used to crack heavy oil. The device generally indicated at 30 can be used in situ in a hydrocarbon formation but can also be used to crack heavy oil in a refinery or other location. The device 30 includes a radio frequency electrical current source 32 and a curved applicator 34. A circular applicator 30 produces both electric and magnetic near fields.

The radio frequency electrical current source 32 is the same as or similar to the radio frequency electrical current source 12 in FIG. 1. The radio frequency current source 12 is electrically connected to the circular applicator 34 at a first connection point 33 and a second connection point 35, thereby creating a closed electrical loop.

The circular applicator 34 can be any curved conductor, for example, a curved metal rod. The circular applicator 34 is positioned within heavy hydrocarbons containing aromatic molecules. For example, the circular applicator 34 can be positioned in situ within an ore region of a hydrocarbon formation. Alternatively, the circular applicator 34 can be located in a refinery or other location and used to crack heavy hydrocarbons that have already been extracted.

For such an applicator, the magnetic field 36 that forms when the device is operated is concentrated substantially through the center of the circular applicator 34. Therefore, when the device is operated heavy hydrocarbons including aromatic molecules within or nearby the circular applicator 34 can be cracked into lighter polar molecules.

Multiple circular applicators 30 can create zones of uniform magnetic fields. In this arrangement, each circular applicator 30 carries an equal electrical current flowing in the same direction. The circular applicators 30 can be separated by a distance equal to the diameter of each circular applicator 30. While the linear applicator 14 operates on the principle of divergence, the circular applicator 30 operates on the principle of curl. Thus, the line and the circle geometry can both provide the required electric and magnetic near fields. Compound embodiments of the applicators may be also be rendered. A coil of wire can be formed by multiple circular applicators 30 connected in series. Helix, solenoid, and spiral coils are thus contemplated applicator embodiments.

A representative field test will now be described. A linear applicator 14 was used as depicted in FIG. 2. The chamber 16 was filled with heavy hydrocarbons including 32.27 percent aromatic molecules and 27.09 percent polar molecules. The radio frequency source 12 was operated at 6.78 Megahertz. After running the device for 18 minutes, the hydrocarbons were analyzed and virtually all of the aromatic molecules had been converted to polar molecules. Present in the oil after processing were 0.96 percent aromatic molecules and 60.92 percent polar molecules. Table 1 details the Field Test Results:

TABLE 1

| Field Test Results | | |
| --- | --- | --- |
| Parameter | Value | Comment |
| Objective | Bitumen ore upgrading | |
| Hydrocarbons 17/test sample | Rich Athabasca oil sand. By weight, 16% bitumen, 1.2% water, remainder sand and clay | Mined near Fort McMurray, Canada |

TABLE 1-continued

Field Test Results

| Parameter | Value | Comment |
|---|---|---|
| Field Test Result | Near total conversion of aromatic molecule fraction to polar molecules was accomplished | Measured |
| Test sample relative dielectric permittivity, real component, prior to application of electromagnetic fields | ≈9 at 6.78 MHz | Measured |
| Test sample electrical conductivity, prior to application of electromagnetic fields | 0.012 mhos/meter at 6.78 MHz | Measured |
| Test sample density | 0.072 pounds/inch$^3$ (2.0 g/cm$^3$) | Measured and calculated |
| Chamber 16 geometry | Polycarbonate plastic tube, 4 inches (10 cm) in diameter, 12 inches (30 cm) high | Measured |
| Test sample volume | 150.7 inches$^3$ (2470 cm$^3$) | Measured |
| Test sample weight | 10.9 pounds (4.94 Kg.) | Measured |
| Duration of electromagnetic field exposure | 18 minutes | Measured |
| Initial temperature | 20° C. | Measured |
| Ending temperature | 86° C. | Measured |
| Test sample aromatic content before test (of the ore's hydrocarbon fraction) | 32.27% by weight | Measured |
| Test sample polar content before test (of the ore's hydrocarbon fraction) | 27.09% by weight | Measured |
| Test sample saturate content before test (of the ore's hydrocarbon fraction) | 17.23% by weight | Measured |
| Test sample asphaltene content before test (of the ore's hydrocarbon fraction) | 23.41% by weight | Measured |
| Test sample aromatic content after test (of the ore's hydrocarbon fraction) | 0.96% by weight | Measured |
| Test sample polar content after test (of the ore's hydrocarbon fraction) | 60.92% by weight | Measured |
| Test sample saturate content after test (of the ore's hydrocarbon fraction) | 15.30% by weight | Measured |
| Test sample asphaltene content after test (of the ore's hydrocarbon fraction) | 22.82% by weight | Measured |
| Test sample temperature before test | 30° C. | Measured |
| Test sample temperature after test | 82° C. | Measured |
| Radio frequency of electrical current source 12 | 6.78 MHz | Measured |
| Linear applicator 14 construction | 12 inch (30 cm) long brass rod, $^3$/$_8$ inch (0.95 cm) OD | Implemented |
| Transformer 24 | Two ring transformer with resonant secondary | |
| Transformer primary winding diameter | 3 feet (0.9 m) | Measured |
| Transformer secondary winding diameter | 5 feet (1.5 m) | Measured |
| Transformer secondary winding | One turn of ½ inch (1.27 cm) (nominal) copper water pipe | Specified |
| Transformer primary winding | One turn of ½ inch (1.27 cm) (nominal) copper water pipe | Specified |
| Secondary winding resonating capacitor | 90 picofarads | Measured |
| H field strength realized in test sample | 7 Amps/meter | Calculated |
| E field strength realized in test sample | 420 Volts/meter | Calculated |
| Electromagnetic field impedance (ratio of E/H in test sample) | 60 ohms | Calculated |
| Induced electric currents in test sample | 0.86 amps/meter$^2$ | Calculated |
| Energy delivered to the test sample | 8.5 watt hours per pound of mass (18.7 watt-hours per Kg. of mass) | Calculated |

In the control experiment, heating the rich Athabasca oil sand from 30° C. to 100° C. by conducted heat in a conventional oven did not significantly convert the aromatic molecules to polar molecules. Therefore, the electric and magnetic fields were essential to initiate the molecular cracking.

The inventors have the following theory to explain the above results. The invention is not limited by the accuracy or applicability of this theory. The radio frequency electric and magnetic fields are akin to a catalyst. The radio frequency electric and magnetic fields raised the vibrational energy of the liquid water molecules in the oil sand relative to the hydrocarbon molecules. In other words, selective heating was realized. The effect was that the bulk heating of the oil sand was minimized while the pore water in oil sand was at high kinetic energy and temperature. The Field Test accomplished a bulk low temperature steam cracking process from pore water. Water in the oil sand can donate radicals, such as the hydroxyl radical OH— to help initiate the cracking and upgrading reaction.

During the test, dry nitrogen was introduced in the inlet 122 to pressurize the test chamber 16. The dry nitrogen provided a gas pressure drive to release the bitumen from the sand, such that water and oil 128 were produced together from the outlet 126 at the bottom of the chamber 16. Thus, the chamber 16 functioned as a separation cell as well as an upgrader. The oil produced at the outlet 126 was sent for chemical analysis. The produced oil was observed to be thinned in viscosity relative to Clark Process bitumen, which means the electric and magnetic fields reduced the API gravity. Some roiling of the oil sand was noted about 10 minutes after the electric and magnetic fields were applied, which indicates the electric and magnetic fields provided the energy to pop the water pores to release oil. The electric and magnetic fields provided a synergy to both separate bitumen from the sand and to upgrade the bitumen at the same time. No coking of the chamber 16 or applicator 14 was noted after the Field Test, which can in some embodiments be an advantage of the present invention over conventional high temperature (≈900° C.) steam cracking processes.

The Field Test delivered 8.53 watt hours of energy per pound of mass (18.76 watt-hours per Kg. of mass) to the oil sand. When aromatic molecules are broken, they become assymetric and polar (polarized to electric fields). This was observed in the Field Test data as the decrease in aromatic molecules was accompanied by a corresponding increase in polar molecules.

The electrical energy cost to treat large volumes of rich Athabasca oil sand will now be considered. Treatment times and RF powers were not optimized in the Field Test described above. An approximation of the minimum amount of electrical energy required to convert the aromatic molecules to polar molecules as shown in Table 2.

| Electrical Energy Costs To Treat Hydrocarbon Ore | |
|---|---|
| Hydrocarbon ore | Rich Athabasca oil sand |
| Objective | Conversion of greater than 90% of the aromatics to polar. |
| Ore specific heat $C_p$ | 0.26 BTU/lb · ° F. (0.43 Watt-hours/° C. · kg) |
| Ore starting temperature | 86° F. (30° C.) |
| Ore Ending temperature | 187° F. (86° C.) |
| Ore ΔT | 119° F. (° C.) |
| Delivered energy required | 24 BTU per pound of ore mass |
| Delivered energy required | 3.2 watt-hours per kg of ore mass |
| Transmitter efficiency η (RF source 12) | 65% |
| Applicator efficiency (linear applicator 14) | 90% |
| Prime electrical energy required (e.g. 60 Hz) | 10.5 watt hours per pound of ore mass (23.2 Watt-hours/kg) |
| Electrical energy rate (e.g. 60 Hz) | $0.12 per kilowatt hour |
| Electrical energy cost (e.g. 60 Hz) | $2.11 US dollars per ton of ore treated ($2.33/1000 Kg) |

It is anticipated that further optimization will further reduce the electrical energy cost.

Many operating concepts are possible. For example, the invention may include cogeneration to recover the waste heat from an on-site 60 Hz electrical generator. Separated bitumen without sand may be RF treated, such as bitumen previously separated by the Clark Process. The applicator 14 can provide the cracking in situ and underground, where the electric and magnetic near fields also stimulate well production.

Figure 4:
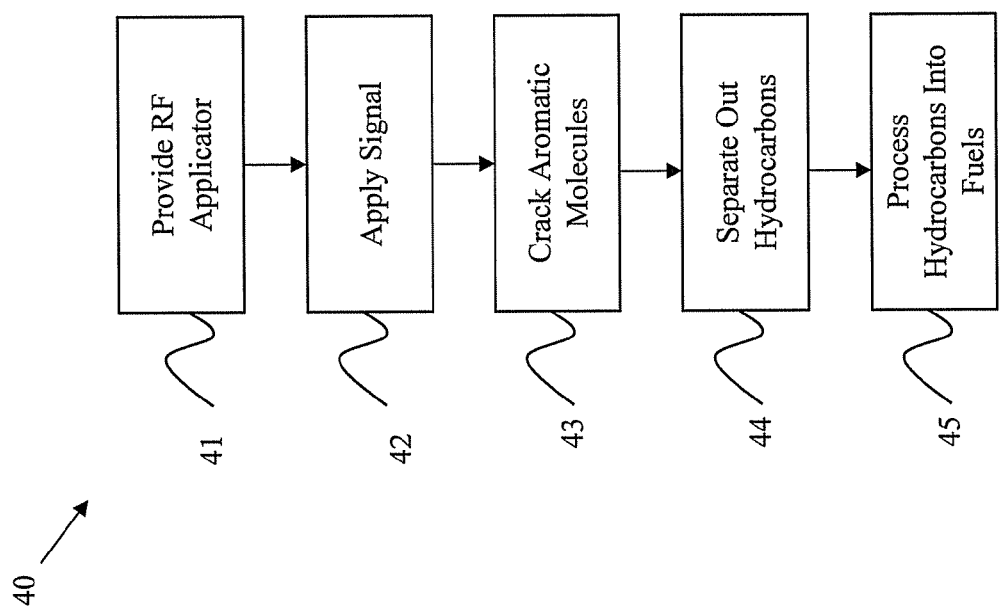
FIG. 4 is a flow diagram illustrating a method for pretreating heavy hydrocarbons

FIG. 4 depicts a method for pretreating heavy hydrocarbons 40. At the step 41, an applicator is placed into heavy hydrocarbons including aromatic molecules that have already been extracted. In this case, the ore has already been extracted. The ore can be, for example, oil sand, which contains sand and water in addition to the hydrocarbons. The applicator can be, for example, the same or similar to the linear applicator of FIG. 1. Alternatively, the applicator can be, for example, the same or similar to the circular applicator of FIG. 3 or a coil formed from multiple applicators.

At the step 42, a radio frequency electrical current is applied to the applicator, which is sufficient to create a magnetic field relative to the applicator. For example, a 0.001 to 100 MHz signal can be sufficient to create an electric and a magnetic field relative to the applicator to crack aromatic molecules in the ore. At the step 43, the electric field and the magnetic field formed in the step 42 cracks the aromatic molecules into polar molecules.

At the step 44, the hydrocarbons are separated from water, sand, and other materials present in the hydrocarbons. Known techniques can be used to separate the hydrocarbons from the water and sand. For example, they can be separated using hot water and surfactant in a cyclone separator or primary separation vessel. Alternatively, separating the sand and upgrading the hydrocarbons can occur simultaneously.

At the step 45, the hydrocarbons are processed into fuels. The hydrocarbons from step 44, which now consist of the cracked hydrocarbons (or hydrocarbons containing polar molecules and few aromatic molecules) go through further processing in order to make fuels. One or more known processing steps can follow. For example, the cracked hydrocarbons can be hydrogenated to by adding hydrogen or natural gas to the hydrocarbons, which results in synthetic crude oil. The synthetic crude oil can then be further processed, for example, by fractionating or catalytic cracking resulting in sour synfuels. Finally, the sour synfuels can be processed through sweeting, which includes sulfur and metal removal. The final result is sweet fuel, such as gasoline, diesel, and JP4.

Figure 5:
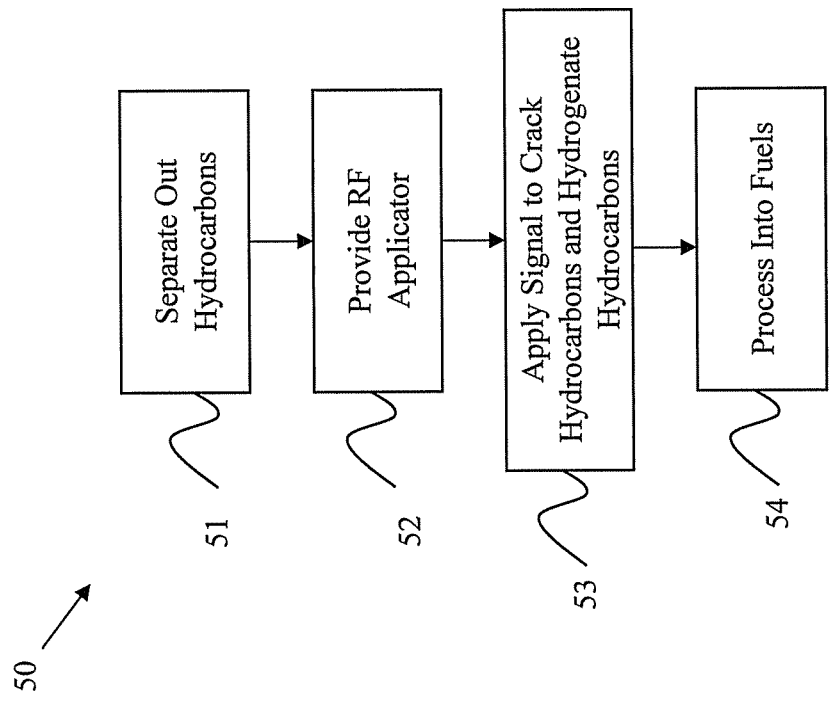
FIG. 5 is a flow diagram illustrating a method for upgrading heavy hydrocarbons.

FIG. 5 depicts a method for upgrading heavy oil 50. At the step 51, the hydrocarbons are separated from water and sand present in the ore containing heavy hydrocarbons including aromatics molecules that have already been extracted. Known techniques can be used to separate the hydrocarbons from the water and sand. For example, they can be separated using hot water and surfactant.

At the step 52, an applicator is placed into the heavy hydrocarbons. The applicator can be, for example, the same or similar to the linear applicator of FIG. 1. Alternatively, the applicator can be, for example, the same or similar to the circular applicator of FIG. 3.

At the step 53, a radio frequency electrical current is applied to the applicator, which is sufficient to create electric and magnetic fields relative to the applicator that can crack the aromatic molecules into polar molecules, and the oil is hydrogenated to create synthetic crude oil.

It is contemplated that an advantage of certain embodiments herein is that the heavy oil can be simultaneously cracked and hydrogenated. The process of hydrogenation includes adding hydrogen or natural gas to the oil, and generally needs activation energy such as heat to complete. In addition to cracking the aromatic molecules into polar molecules, the magnetic fields can heat the oil through resistive and conductive heating.

For example, magnetic near fields (H) surrounding the applicator cause eddy electric currents to form in the hydrocarbons by inductive coupling. The eddy electric currents then heat the ore by resistance heating or joule effect, such that the heating is a compound process. The applicator is akin to a transformer primary winding and the ore the secondary winding, although windings do not exist in the conventional sense. The magnetic near field mode of heating is reliable as it does not require liquid water contact with the applicator. The electric currents flowing along the applicator surfaces create the magnetic fields, and the magnetic fields curl in circles around the antenna axis. The strength of the heating in the ore due to the magnetic fields and eddy currents is proportional to:

$$P = \pi^2 B^2 d^2 f^2 / 12\rho D$$

Where:
P=power delivered to the ore in watts
B=magnetic flux density generated by the well antenna in Teslas
D=the diameter of the well pipe antenna in meters
P=the resistivity of the hydrocarbon ore in ohmmeters=$1/\sigma$
f=the frequency in Hertz
D=the magnetic permeability of the hydrocarbon ore The strength of the magnetic flux density B generated by a linear applicator 14 derives from Ampere's law and is given by:

$$B_\phi = \mu I L e^{-jkr} \sin\theta / 4\pi r^2$$

Where:
B=magnetic flux density generated by the well antenna in Teslas
μ=magnetic permeability of the ore
I=the current along the well antenna in amperes
L=length of antenna in meters
$e^{-jkr}$=Euler's formula for complex analysis=cos (kr)+j sin (kr)
θ=the angle measured from the well antenna axis (normal to well is 90 degrees)
r=the radial distance outwards from the well antenna in meters In free space, the electromagnetic near fields produced by a circular applicator 30, e.g. a loop or curl antenna are exactly:

$$H_r = a^2 (I_o L e^{-jkr} / 2r^3) \cos\theta$$

$$H_\theta = a^2 (I_o L e^{-jkr} / 4r^3) \sin\theta$$

$$E_\phi = -ja^2 (k I_o e^{-jkr} / 4r^2) \sin\theta$$

$$H_\phi = E_r = E_\phi = 0$$

Where:
$H_r$=the radial magnetic near field
$H_\theta$=the circular magnetic near field
$E_\phi$=the circula electric near field
−j=the complex operator=$\sqrt{-1}$
A=area inside of the applicator 30
$I_o$=the electric current flowing in the circular applicator 30, uniform distribution assumed
L=the length of the circular applicator 30
$e^{-jkr}$=the time harmonic excitation (AC sinusoidal current is assumed)
k=the wave number=$2\pi/\lambda$
r=the radial distance measured from the center of the circular applicator 30
θ=the angle measured from the plane of the circular applicator 30 (normal to the linear applicator 14 is 90°)

The circular applicator 30 produces slightly more magnetic field strength than the linear applicator 14 while the linear applicator 14 produces slightly more electric field strength. However, the effectiveness of the linear applicator 14 and circular applicator 30 are similar. The linear applicator 14 can be preferred for underground applications and can be comprised of, for example, a well pipe. The circular applicator can be preferred for certain surface applications. Any partially electrically conductive ore can be heated by application of electric and magnetic fields described herein as long as the resistance of the applicator's electrical conductors (metal pipe, wires) is much less than the ore resistance.

At the step 54, the synthetic crude oils are processed into fuels. One or more known processing steps can follow. The synthetic crude oil can then be further processed, for example, by fractionating or catalytic cracking resulting in sour synfuels. Finally, the sour synfuels can be processed through sweeting, which includes sulfur and metal removal. The final result is sweet fuel, such as gasoline, diesel, or JP4.

Figure 6:
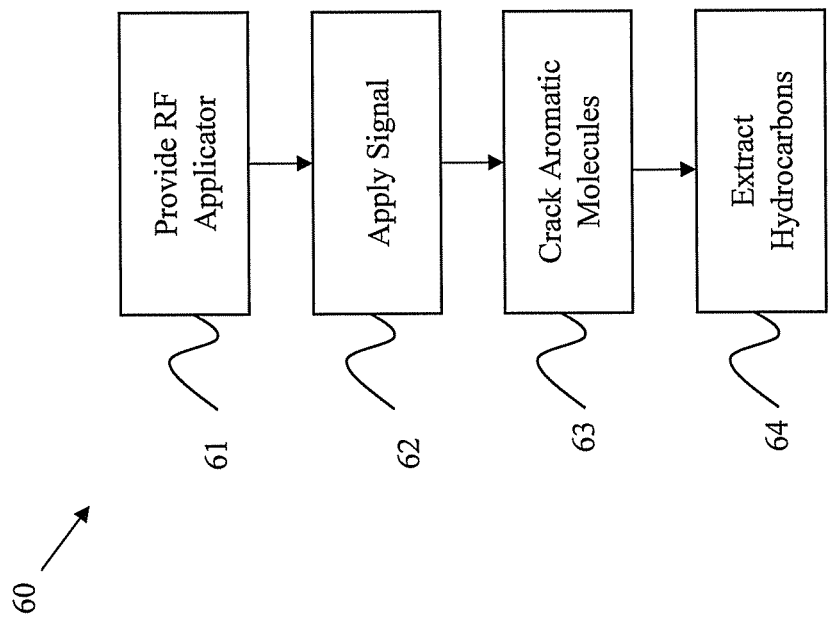
FIG. 6 is a flow diagram illustrating a method for extracting heavy hydrocarbons.

FIG. 6 depicts a method for extracting heavy oil 60. At the step 61, an applicator is positioned into the ore region of a hydrocarbon formation containing heavy hydrocarbons including aromatic molecules. The applicator can be, for example, the same or similar to the linear applicator of FIG. 1. Alternatively, the applicator can be, for example, the same or similar to the circular applicator of FIG. 3. An advantage of using a linear applicator is that an existing or installed conductive pipe can function as the linear applicator. For example, the linear applicator can be a typical steel well pipe that may or may not be coated in a highly conductive metal, such as copper.

At the step 62, a radio frequency electrical current is applied to the applicator, which is sufficient to create a magnetic field that can crack the aromatic molecules into polar molecules. For example, a 0.001 to 100 MHz signal can be sufficient to create a circular magnetic field relative to the applicator to crack aromatic molecules in the ore. At the step 63, the magnetic field formed in the step 62 cracks the aromatic molecules into polar molecules.

At the step 64, the cracked hydrocarbon molecules are extracted. For example, the lighter polar molecules can flow into an extraction pipe, or pumps or other mechanisms in the formation can pump the oil to the surface.

Figure 7:
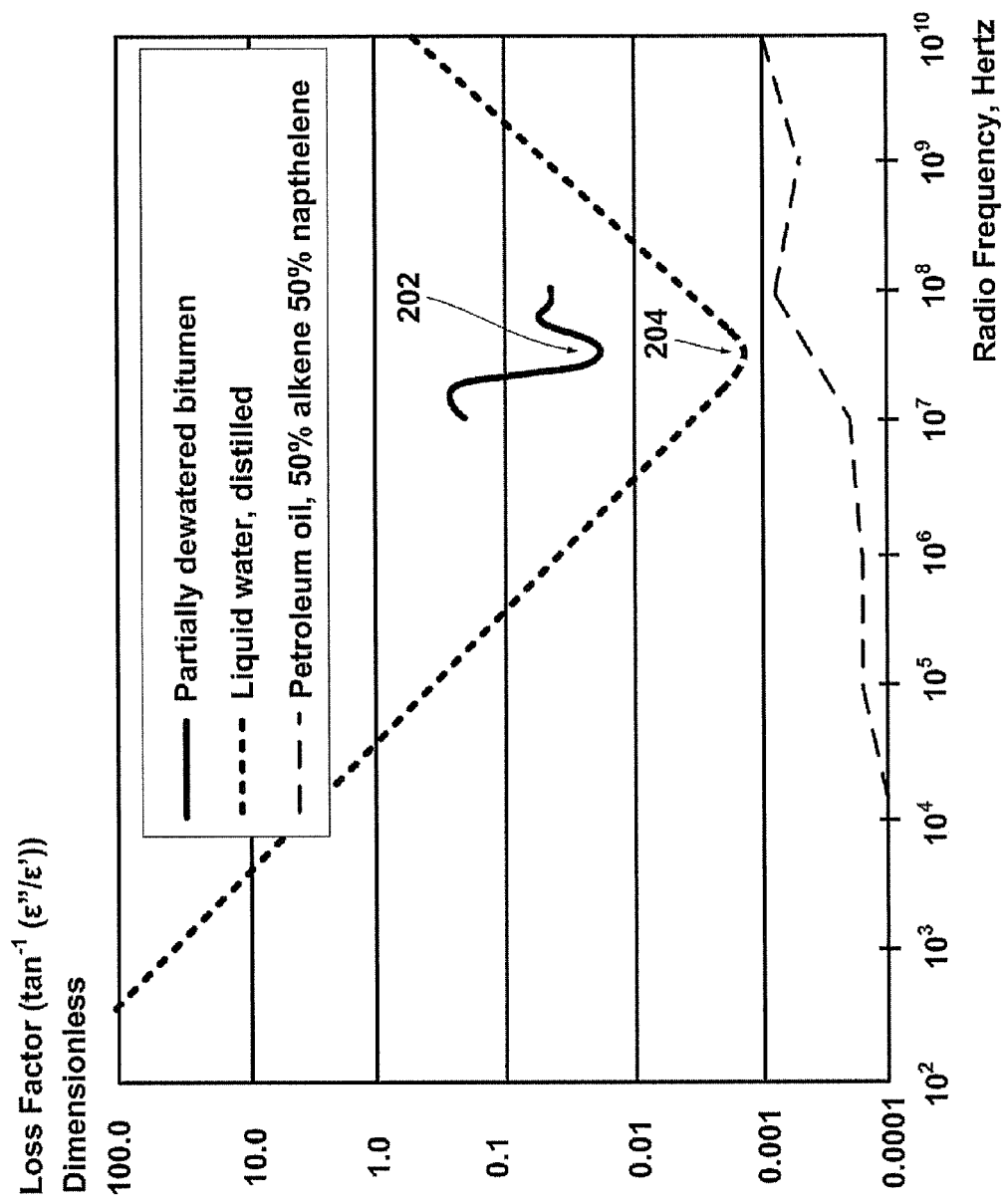
FIG. 7 is a plot of the radio frequency response of pure water and petroleum oil.

FIG. 7 shows the frequency response of a medium weight hydrocarbon oil. It provides a plot of the loss factor of distilled liquid water, partially dewatered bitumen, and a 50% alkene 50% napthalene mixture of petroleum oil. Loss factor indicates how much a material will heat when an electromagnetic field is applied to it. Thus, a molecule with a high loss factor will heat more than a material with a low loss factor. There is a minimum at point 202 in the frequency response of the partially dewatered bitumen and there is also a minimum 204 in the frequency response of the distilled liquid water. The two minima 202, 204 coincide in frequency and are near 30 MHz. The minima 202, 204 comprise an antiresonance of the water fraction. Operating the transmitter 22 at a frequency near the minima 202, 204 antiresonance of water to reduce the kinetic energy of the water molecules in the hydrocarbon stock relative to the kinetic energy of the hydrocarbon molecules can be advantageous.

It can also be advantageous to adjust the radio frequency away from the water antiresonance frequency (say below 15 MHz or above 60 MHz) to increase the kinetic energy of water molecules relative to the kinetic energy of hydrocarbon molecules. Thus, it is possible to instantaneously adjust the temperature of water molecules in the mixture relative to the temperature of hydrocarbon molecules by adjusting the radio frequency. Adjusting the temperature of molecules initiates and controls chemical reactions. Varying the radio frequency allows precise control of a low bulk temperature steam cracking process.

The radio frequency electromagnetic fields provided by the linear applicator 14 and the curl applicator 30 can also control the formation and activity of water spawned radicals. The hydroxyl radical OH— can be formed from water and it reacts quickly with heavy hydrocarbons. Radicals can be formed in the presence of radio frequency electromagnetic fields, especially magnetic fields, which are known to influence the nuclear spins of the paramagnetic water molecules. Radicals (often referred to as free radicals) are atoms, molecules, or ions with unpaired electrons on an open shell configuration. The unpaired electrons cause radicals to be highly chemically reactive. Water can be slightly repelled by magnetic fields (diamagnetism) while radicals are slightly attracted by magnetic fields (paramagnetism). RF electric currents in water are not generally expended through water electrolysis, which commonly occurs when DC electric currents pass through water. This means that the water is not split significantly into hydrogen and oxygen gasses by RF electric currents, so the energy of RF electric currents is available to increase the kinetic energy of the water molecules and to form radicals.

Figure 8:
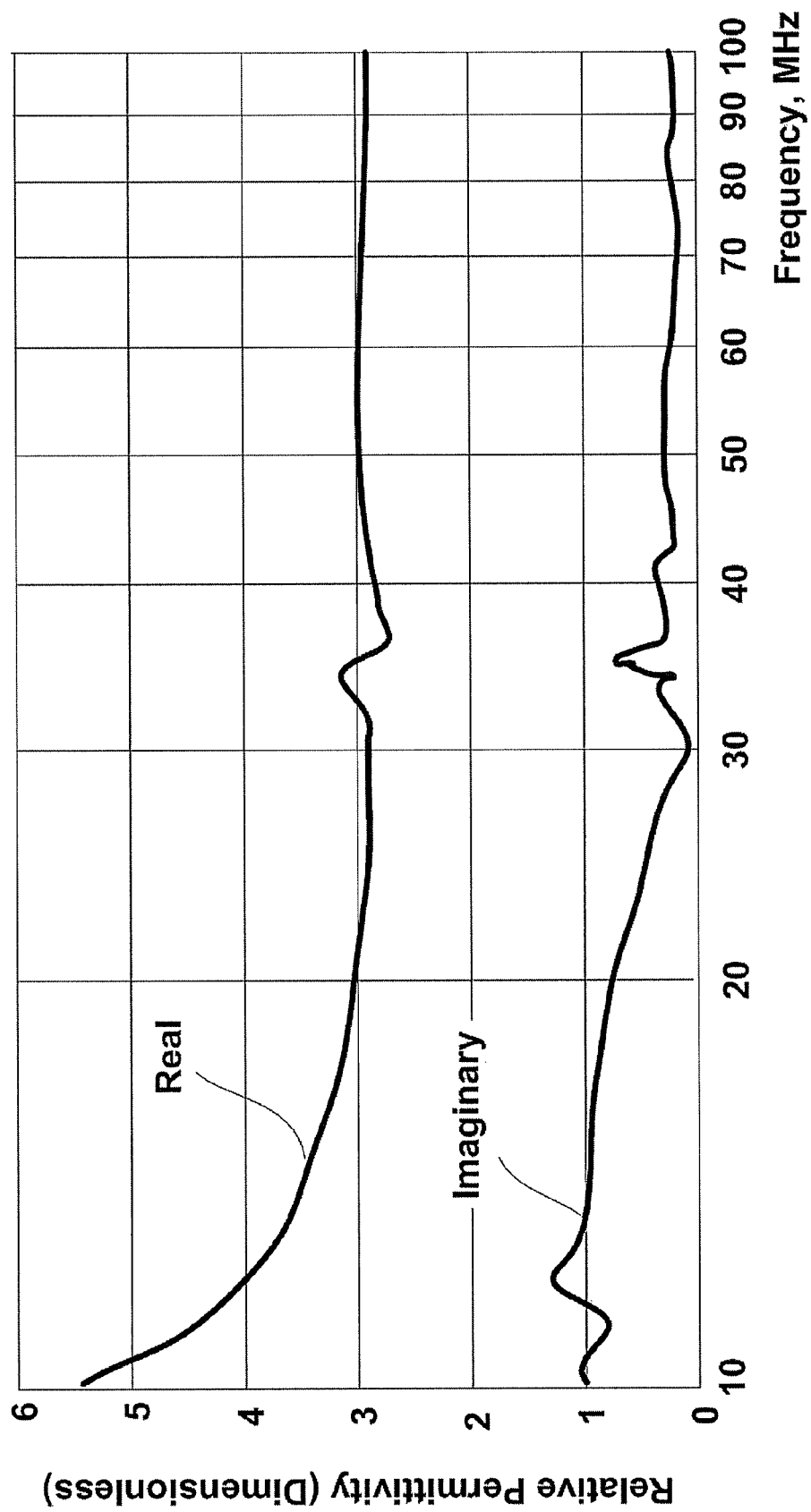
FIG. 8 is a plot of the relative dielectric constants of a liquid bitumen (dilbit).

FIG. 8 shows the real and imaginary relative permittivity $\in_r'$ and $\in_r''$ for liquid bitumen. It depicts the real and imaginary relative dielectric constants for a dilbit produced in Athabasca Province, Canada. The liquid bitumen included naptha to reduce viscosity, and it included about 2% water by weight. The effects of the 2% water fraction are quite evident in FIG. 8. The 2% water fraction caused a local minimum in the imaginary permittivity ($\in_r''$) near 30 MHz. This minimum occurred because the frequency response of the hydrocarbon molecules was relatively flat compared to the more variable response of the water. Water reacts strongly to the RF electromagnetic fields at frequencies away from about 30 MHz and less so near 30 MHz. Heavy hydrocarbon molecules can have resonant responses at frequencies near 30 MHz, but the dilbit hydrocarbon response is flat because dilbit contains hydrocarbons of many molecular weights. Thus, the radio frequency may be varied relative 30 MHz to control the reactivity of water in the chemical reaction.

Radio frequency electric and magnetic fields were tested on the FIG. 8 dilbit at or near the water antiresonance frequency (27.12 MHz was used) and cracking occurred. The water antiresonance may be useful over a broad range in the present invention, for example, from 0.001 to 100 MHz. Adjusting the radio frequency of the transmitter 22 to vary the reactivity of water relative to the hydrocarbons by tuning frequency toward or away from water antiresonance frequency can be advantageous. Adjusting the frequency of the transmitter 2 near the water antiresonance frequency reduces the kinetic energy and temperature of the water molecules relative to the hydrocarbons. Adjusting the frequency of the transmitter 22 away from the water antiresonance increases the kinetic energy of the water molecules relative to the hydrocarbons. Temperature and activity of the water molecule fraction is adjusted precisely and instantaneously by adjusting the radio frequency of the transmitter 22. The permittivity ($\in$) of a material is a measure of how radio frequency electric fields affect a medium. Thus, in FIG. 8 the imaginary component of the relative permittivity ($\in''$) is a good measure of how much a material fraction will radio frequency heat, and it relates to the selective heating and kinetic energy that different molecular species will receive in RF electromagnetic fields.

The preferred radio frequencies, between about 0.001 to 100 MHz, have the advantage of being practical at industrial process scale and power level. The prompt (nearly instantaneous) half power penetration depth of electromagnetic near fields, both electric and magnetic (E and H) in rich Athabasca oil sand ore at 1 MHz is about 10 meters, and the ultimate penetration depth over time can be extended nearly indefinitely if heating is allowed to progress. Higher and lower radio frequencies can be used to increase or reduce the penetration depth of the electric and magnetic fields to any depth desired. The equation for radio frequency skin depth approximates the electric and magnetic field penetration:

$$\delta = \sqrt{(\rho/\omega\mu)}$$

where
  $\delta$=the skin depth,
  $\rho$=the resistivity of the hydrocarbon formation or feedstock
  $\omega$=the angular frequency=$2\pi f$,
  and $\mu$=the absolute magnetic permeability which is typically $4\pi \times 10^{-7}$ in hydrocarbon ores. In addition to RF skin depth Lamberts Law also applies, e.g. the electromagnetic fields weaken with distance due to geometric spreading.

The addition of sodium chloride (salt, NaCl) to the hydrocarbon feedstock or underground ore modifies solution ion content, electrical conductivity, and imaginary permittivity. The addition of a caustic alkali, such as sodium hydroxide (NaOH) or sodium carbonate ($Na_2CO_3$) to the process feedstock or underground ore can also be useful: caustic alkali has the synergy and operative advantage of increasing the imaginary dielectric constant of the water in the feedstock relative to the dielectric constant of the hydrocarbons. The caustic alkali may also provide a surfactant.

The role of the hydroxyl radical OH— can be important as an initiator molecule. Therefore, exposing hydrocarbon material containing water to radio frequency electric and magnetic fields at frequencies corresponding to the 18 cm transition wavelengths of the hydroxyl radical, for example, at 1612, 1665, 1667 and 1720 MHz can enhance the presence and activity of the hydroxyl radical.

Although preferred embodiments have been described using specific terms, devices, and methods, such description is for illustrative purposes only. The words used are words of description rather than of limitation. It is to be understood that changes and variations can be made by those of ordinary skill in the art without departing from the spirit or the scope of the present invention, which is set forth in the following claims. In addition, it should be understood that aspects of the various embodiments can be interchanged either in whole or in part. Therefore, the spirit and scope of the appended claims should not be limited to the description of the preferred versions contained herein.

The invention claimed is:

1. An apparatus for processing hydrocarbons including aromatic molecules comprising:
  a hydrogen containing gas source;
  a chamber coupled to said hydrogen containing gas source and configured to expose the hydrocarbons including aromatic molecules to the hydrogen containing gas;
  a radio frequency (RF) source; and
  an RF applicator coupled to said RF source at spaced apart first and second connection points on opposite sides of said chamber, and with said RF applicator continuously extending across an interior of said chamber between the first and second connection points to create a field in said chamber to crack at least some of the aromatic molecules into polar molecules while exposed to the hydrogen containing gas.

2. The apparatus according to claim 1 wherein said RF applicator comprises a linear RF applicator.

3. The apparatus according to claim 1 wherein said RF applicator comprises a circular RF applicator.

4. The apparatus according to claim 1 wherein said hydrogen containing gas source comprises a hydrogen gas source.

5. The apparatus according to claim 1 wherein said hydrogen containing gas source comprises a natural gas source.

6. The apparatus according to claim 1 further comprising a downstream processing stage coupled to said chamber and configured to perform fractionating.

7. The apparatus according to claim 1 further comprising a downstream processing stage coupled to said chamber and configured to perform catalytic cracking.

8. The apparatus according to claim 1 wherein said chamber has a hydrocarbons inlet and a hydrocarbons outlet.

9. The apparatus according to claim 1 wherein said RF source comprises a transmitter and an impedance coupler connected thereto.

10. The apparatus according claim 1 wherein said RF source is configured to operate at a frequency corresponding to a resonance of the aromatic molecules.

11. The apparatus according to claim 1 wherein said RF source is configured to operate at a frequency corresponding to a dielectric antiresonance of water molecules.

12. The apparatus according claim 1 wherein said RF source is configured to operate at a frequency corresponding to a 18 cm wavelength of the hydroxyl transition.

13. The apparatus according claim 1 wherein said chamber comprises a separation chamber configured to separate another material from the hydrocarbons.

14. The apparatus according claim 1 wherein said chamber comprises a separation chamber configured to separate at least one of water and sand from the hydrocarbons.

15. An apparatus for processing hydrocarbons including aromatic molecules comprising:
a hydrogen containing gas source;
a chamber coupled to said hydrogen containing gas source and configured to expose the hydrocarbons including aromatic molecules to the hydrogen containing gas;
a radio frequency (RF) source; and
a linear RF applicator coupled to said RF source at spaced apart first and second connection points on opposite sides of said chamber, and with said RF applicator continuously extending across an interior of said chamber between the first and second connection points to create a field in said chamber to crack at least some of the aromatic molecules into polar molecules while exposed to the hydrogen containing gas.

16. The apparatus according to claim 15 wherein said hydrogen containing gas source comprises a hydrogen gas source.

17. The apparatus according to claim 15 wherein said hydrogen containing gas source comprises a natural gas source.

18. The apparatus according to claim 15 further comprising a downstream processing stage coupled to said chamber and configured to perform at least one of fractionating and catalytic cracking.

19. The apparatus according to claim 15 wherein said RF source comprises a transmitter and an impedance coupler connected thereto.

20. The apparatus according to claim 15 wherein said RF source is configured to operate at a frequency corresponding to a resonance of the aromatic molecules.

21. The apparatus according to claim 15 wherein said chamber comprises a separation chamber configured to separate another material from the hydrocarbons.

22. An apparatus for processing hydrocarbons including aromatic molecules comprising:
a hydrogen containing gas source;
a chamber coupled to said hydrogen containing gas source and configured to expose the hydrocarbons including aromatic molecules to the hydrogen containing gas;
a radio frequency (RF) source; and
a circular RF applicator coupled to said RF source at spaced apart first and second connection points on opposite sides of said chamber, and with said RF applicator continuously extending across an interior of said chamber between the first and second connection points to create a field in said chamber to crack at least some of the aromatic molecules into polar molecules while exposed to the hydrogen containing gas.

23. The apparatus according to claim 22 wherein said hydrogen containing gas source comprises a hydrogen gas source.

24. The apparatus according to claim 22 wherein said hydrogen containing gas source comprises a natural gas source.

25. The apparatus according to claim 22 further comprising a downstream processing stage coupled to said chamber and configured to perform at least one of fractionating and catalytic cracking.

26. The apparatus according to claim 22 wherein said RF source comprises a transmitter and an impedance coupler connected thereto.

27. The apparatus according to claim 22 wherein said RF source is configured to operate at a frequency corresponding to a resonance of the aromatic molecules.

28. The apparatus according to claim 22 wherein said chamber comprises a separation chamber configured to separate another material from the hydrocarbons.

* * * * *